(12) United States Patent
Lee et al.

(10) Patent No.: US 12,380,878 B2
(45) Date of Patent: Aug. 5, 2025

(54) CALL WORD LEARNING DATA GENERATION DEVICE AND METHOD

(71) Applicants: HYUNDAI MOTOR COMPANY, Seoul (KR); Kia Corporation, Seoul (KR)

(72) Inventors: Eui Hyeok Lee, Gimpo-si (KR); Hyung Sik Gim, Siheung-si (KR); Han Woong Choi, Seoul (KR); Sung Woo Moon, Gunpo-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 228 days.

(21) Appl. No.: 18/463,788

(22) Filed: Sep. 8, 2023

(65) Prior Publication Data
US 2024/0355321 A1    Oct. 24, 2024

(30) Foreign Application Priority Data
Apr. 18, 2023  (KR) .................. 10-2023-0050825

(51) Int. Cl.
*G10L 15/00* (2013.01)
*G10L 15/02* (2006.01)
(Continued)

(52) U.S. Cl.
CPC .......... *G10L 15/063* (2013.01); *G10L 15/02* (2013.01); *G10L 15/08* (2013.01); *G10L 15/22* (2013.01);
(Continued)

(58) Field of Classification Search
CPC ...... G06F 40/284; G06F 40/30; G06F 16/685; H04M 2201/40; G10L 15/07; G10L 15/20;
(Continued)

(56) References Cited

U.S. PATENT DOCUMENTS 7,912,724 B1 *   3/2011   Moorer .................. G10L 15/10
                                                          704/254
9,484,029 B2    11/2016   Jung et al.
(Continued)

FOREIGN PATENT DOCUMENTS

CN    107358954    11/2017
KR    10-1260368    5/2013
(Continued)

OTHER PUBLICATIONS

Hyungwonsnotebook.blogspot.com [online], "Korean Forced Aligner," May 16, 2017, retrieved from URL <http://hyungwonsnotebook.blogspot.com/2017/05/korean-forced-aligner.html>, 17 pages (with English translation).

Primary Examiner — Vu B Hang
(74) Attorney, Agent, or Firm — Fish & Richardson P.C.

(57) ABSTRACT

The present disclosure relates to a device and method for generating call word learning data, and the call word learning data generation device includes a processor and storage. The storage stores utterance data and an utterance phrase corresponding to the utterance data. The processor is configured to decompose the utterance data into phoneme units based on the utterance data and the utterance phrase, to receive a call word through a user input, to decompose the received call word into phoneme units, to compare phoneme data of the call word with phoneme data of the utterance data, and to generate call word learning data by combining phoneme data matched as the comparison result.

20 Claims, 7 Drawing Sheets

```
CALL WORD LEARNING DATA
GENERATION DEVICE 100

PROCESSOR          STORAGE
     110               120
```

(51) Int. Cl.
  *G10L 15/06* (2013.01)
  *G10L 15/08* (2006.01)
  *G10L 15/22* (2006.01)
  *G10L 25/78* (2013.01)
  *G10L 25/90* (2013.01)
(52) U.S. Cl.
  CPC .............. *G10L 25/78* (2013.01); *G10L 25/90* (2013.01); *G10L 2015/025* (2013.01); *G10L 2015/088* (2013.01)
(58) Field of Classification Search
  CPC ......... G10L 15/22; G10L 15/26; G10L 15/30; G10L 15/02; G10L 15/063; G10L 15/08; G10L 15/00; G10L 15/10; G10L 15/12; G10L 15/14; G10L 15/1815; G10L 15/187; G10L 15/197; G10L 15/065; G10L 2015/0631; G10L 25/78; G10L 25/87
  See application file for complete search history.

(56) References Cited

U.S. PATENT DOCUMENTS

| | | |
|---|---|---|
| 10,504,511 B2 | 12/2019 | Wang et al. |
| 2013/0006612 A1 | 1/2013 | Xu et al. |
| 2013/0006623 A1* | 1/2013 | Chelba ................. G10L 15/187 704/E15.045 |
| 2018/0033430 A1 | 2/2018 | Kawano et al. |
| 2021/0406476 A1 | 12/2021 | Pan et al. |
| 2022/0101835 A1* | 3/2022 | Freed .................... G10L 15/065 |

FOREIGN PATENT DOCUMENTS

| | | |
|---|---|---|
| KR | 10-1780760 | 10/2017 |
| KR | 10-2021-0007580 | 1/2021 |

* cited by examiner

CALL WORD LEARNING DATA GENERATION DEVICE AND METHOD

CROSS-REFERENCE TO RELATED APPLICATION

This application claims the benefit of priority to Korean Patent Application No. 10-2023-0050825, filed in the Korean Intellectual Property Office on Apr. 18, 2023, the entire contents of which are incorporated herein by reference.

TECHNICAL FIELD

The present disclosure relates to a device and method for generating call word learning data, and more particularly, relates to a technology for building learning data for recognizing a changeable call word.

BACKGROUND

With the increasing use of speech recognition, ongoing research focuses on various techniques to enhance recognition rates. One such method includes analyzing voice data in phoneme to improve the recognition rate.

Call word recognition technology is emerging as a significant field within speech recognition. The demand for such technology is on the rise. For example, a device that offers specific services upon successful recognition of a call word using speech recognition are actively researched and released.

SUMMARY

The present disclosure has been made to solve the above-mentioned problems.

A call word recognition model learned based on data from recording a call word may need a large amount of recorded data for the changed call word to recognize the changed call word when the call word is changed.

A method of recognizing a call word based on a text by using a grapheme-to-phoneme (G2P) technology recognizes a call word depending on a general phonetic symbol, thereby reducing accuracy.

An aspect of the present disclosure provides a call word learning data generation device used to learn the call word recognition model by building learning data for the changed call word without recording the changed call word even when the call word is changed, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a call word learning data generation device may include a processor and storage. The storage may store utterance data and an utterance phrase corresponding to the utterance data. The processor may be configured to decompose the utterance data into phoneme units based on the utterance data and the utterance phrase, to receive a call word through a user input, to decompose the received call word into phoneme units, to compare phoneme data of the call word with phoneme data of the utterance data, and to generate call word learning data by combining phoneme data matched as the comparison result.

In some implementations, the utterance data may be audio data, and the utterance phrase may be text data. The processor may be configured to estimate location information indicating where a consonant and a vowel included in the utterance phrase are present in the utterance data, and to decompose the utterance data into phoneme units based on the location information.

In some implementations, the user input may be a text input or a voice input. When the user input is a text input, the processor may be configured to convert a grapheme of the call word into a phoneme and to decompose the converted call word into phoneme units.

In some implementations, the processor may be configured to list and combine phoneme data of the utterance data, which is matched with the phoneme data of the call word, in order of phonemes of the call word.

In some implementations, the processor may be configured to determine whether speech recognition is performed on the call word, to calculate a similarity between the speech-recognized call word and the call word learning data when the speech recognition is performed on the call word, and to exclude call word learning data having the similarity less than a specified value.

In some implementations, the processor may be configured to identify a silent section within the call word learning data, and to remove the identified silent section.

In some implementations, the processor may be configured to normalize phoneme data included in the call word learning data.

In some implementations, the processor may be configured to normalize a fundamental frequency and power for the phoneme data.

In some implementations, the processor may be configured to correct a boundary section between pieces of phoneme data included in the call word learning data.

In some implementations, the processor may be configured to perform interpolation of the boundary section by using an average value of a pitch for each window size before and after the boundary section.

According to an aspect of the present disclosure, a call word learning data generating method performed by a call word learning data generation device may include decomposing utterance data into phoneme units based on the utterance data and an utterance phrase stored in the call word learning data generation device, receiving a call word through a user input, decomposing the received call word into phoneme units, comparing phoneme data of the call word with phoneme data of the utterance data, and generating call word learning data by combining phoneme data matched as the comparison result.

In some implementations, the utterance data may be audio data, and the utterance phrase may be text data. The decomposing of the utterance data into the phoneme units may include estimating location information indicating where a consonant and a vowel included in the utterance phrase are present in the utterance data, and decomposing the utterance data into phoneme units based on the location information.

In some implementations, the user input may be a text input or a voice input. When the user input is a text input, the decomposing of the utterance data into phoneme units may include converting a grapheme of the call word into a phoneme, and decomposing the converted call word into phoneme units.

In some implementations, the generating of the call word learning data by combining the phoneme data matched as the comparison result may include listing and combining phoneme data of the utterance data, which is matched with the phoneme data of the call word, in order of phonemes of the call word.

In some implementations, the call word learning data generating method may further include determining whether speech recognition is performed on the call word, calculating a similarity between the speech-recognized call word and the call word learning data when the speech recognition is performed on the call word, and excluding call word learning data having the similarity less than a specified value.

In some implementations, the call word learning data generating method may further include identifying a silent section within the call word learning data, and removing the identified silent section.

In some implementations, the call word learning data generating method may further include normalizing phoneme data included in the call word learning data.

In some implementations, the normalizing of the phoneme data may include normalizing a fundamental frequency and power for the phoneme data.

In some implementations, the call word learning data generating method may further include correcting a boundary section between pieces of phoneme data included in the call word learning data.

In some implementations, the correcting of the boundary section may include performing interpolation of the boundary section by using an average value of a pitch for each window size before and after the boundary section.

DETAILED DESCRIPTION

Figure 1:
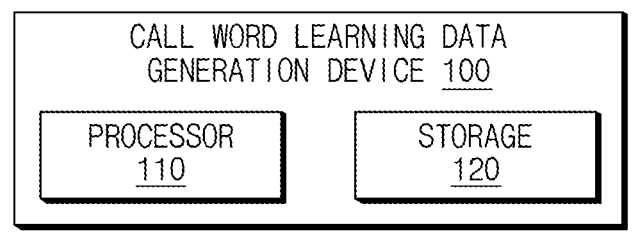
FIG. 1 is a block diagram illustrating an example of a call word learning data generation device.

FIG. 1 is a block diagram showing a configuration of a call word learning data generation device.

Referring to FIG. 1, a call word learning data generation device 100 may include a processor 110 and storage 120. The processor 110 may be operatively connected to the storage 120. The processor 110 may perform operations described below by executing instructions stored in the storage 120.

The processor 110 may collect utterance data and an utterance phrase corresponding to the utterance data. The utterance data may be audio data. The utterance data may be noise-free voice data created in advance. For example, the utterance data may include standard utterance data built for a speech recognizer and/or voice data collected during general conversation. The utterance phrase may be text data. For example, the utterance phrase may be referred to as a "correct answer data" indicating the utterance data by using a text.

The processor 110 may decompose the utterance data into phoneme units based on the utterance data and the utterance phrase. For example, the processor 110 may estimate location information indicating where a consonant and a vowel included in the utterance phrase are present in the utterance data. The processor 110 may estimate the location information by using a sorting algorithm. For example, the sorting algorithm may include a Montreal forced aligner (MFA) algorithm and/or a dynamic time warping (DTW) algorithm.

The processor 110 may decompose the utterance data into phoneme units based on the location information. For example, the processor 110 may identify phonemes corresponding to the consonant and vowel of the utterance phrase from the utterance data and then may decompose the utterance data into phoneme units based on a location of the identified phoneme. For example, the utterance data may include pieces of data decomposed for each phoneme unit.

The processor 110 may receive a call word through a user input. For example, the user input may be a text input or a voice input. For example, the user input may be a user input for changing a call word. For example, the call word may include the changed call word.

The processor 110 may decompose the received call word into phoneme units. For example, when the user input is a text input, the processor 110 may convert the grapheme of the call word into a phoneme. For example, the processor 110 may convert the grapheme of a text into a phoneme by using a G2P model. For example, the G2P model may be a statistical model or a deep neural network (DNN)-based model. The processor 110 may decompose the converted call word into phoneme units. For example, when the user input is a voice input, the processor 110 may decompose a call word into phoneme units without a separate conversion process.

The processor 110 may compare phoneme data of the call word with phoneme data of the utterance data. For example, the processor 110 may determine whether the phoneme data of the call word with the phoneme data of the utterance data, by comparing data, which is decomposed into phoneme units of the call word, with data decomposed into phoneme units of the utterance data. For example, when it is determined that the two pieces of phoneme data are the same as each other, the processor 110 may determine that the two pieces of phoneme data match each other.

The processor 110 may generate call word learning data by combining phoneme data matched as a result of the comparison. For example, the processor 110 may list and combine the phoneme data of the utterance data that is matched with the phoneme data of the call word in order of phonemes of the call word. For example, pieces of phoneme data of utterance data matching a piece of phoneme data of call word may be present. For example, the processor 110 may generate pieces of combined data in which the pieces of phoneme data of the utterance data are included in the corresponding phoneme order.

For example, the processor 110 may determine whether the call word is recognized. For example, when the speech recognition is performed on the call word, the processor 110 may calculate the similarity between the speech-recognized call word and the generated call word learning data. For example, the processor 110 may exclude call word learning data having the similarity with the speech-recognized call word that is less than a specified value. The processor 110 may use call word learning data having the similarity with the speech-recognized call word, which is not less than the specified value, as call word learning data primarily generated.

The processor 110 may perform post-processing on the call word learning data primarily generated. For example, the call word learning data generated primarily by simply combining pieces of phoneme data may be unnatural. The processor 110 may perform a post-processing operation to be described later such that a natural utterance for the primarily generated call word learning data is provided.

For example, the processor 110 may identify a silent section within the call word learning data. For example, the processor 110 may identify a section, in which a level of sound is not greater than a specified level (e.g., specified decibel (dB)), as the silent section. The specific processor 110 may remove the identified silent section. For example, the processor 110 may convert the sound level of the silent section to '0' and may cut the section having '0' in data.

For example, the processor 110 may normalize phoneme data included in the call word learning data. The processor 110 may remove the silent section in the call word learning data and then may normalize the phoneme data included in the call word learning data. For example, the processor 110 may normalize the fundamental frequency $f_0$ and power for the phoneme data. The processor 110 may normalize the fundamental frequency and power of each of pieces of phoneme data such that the pitch and volume of the sound of data obtained by combining the pieces of phoneme data are within a specified range.

For example, the processor 110 may correct a boundary section between pieces of phoneme data included in the call word learning data. The processor 110 may remove a silent section within the call word learning data and then may correct a boundary section between pieces of phoneme data included in the call word learning data. The boundary section may be referred to as a portion changed from a piece of phoneme data to another piece of phoneme data in pieces of combined phoneme data. For example, the processor 110 may perform interpolation of a boundary section by using an average value of a pitch for each window size before and after the boundary section. The processor 110 may allow combined data to be naturally connected, by correcting the boundary section between pieces of phoneme data.

For example, the processor 110 may remove a silent section in the call word learning data, may normalize phoneme data included in the call word learning data, and may correct the boundary section between pieces of phoneme data.

The processor 110 may use the post-processed call word learning data as final generated learning data. For example, the processor 110 may learn a call word recognition model by using the finally generated learning data.

The storage 120 may store instructions executed by the processor 110. The storage 120 may store data necessary for the processor 110 to perform an operation. For example, the storage 120 may store utterance data and an utterance phrase corresponding to the utterance data. For example, the storage 120 may store the call word recognition model.

The storage 120 may store data or information processed by the processor 110. For example, the storage 120 may store the call word learning data generated by the processor 110. For example, the storage 120 may store the call word recognition model learned by using the generated call word learning data.

Even when the call word is changed, the call word learning data generation device 100 may generate call word learning data without a recording process for the changed call word, may learn the call word recognition model by using the generated call word learning data, and thus may allow the learned call word recognition model to quickly and accurately recognize the call word.

Figure 2:
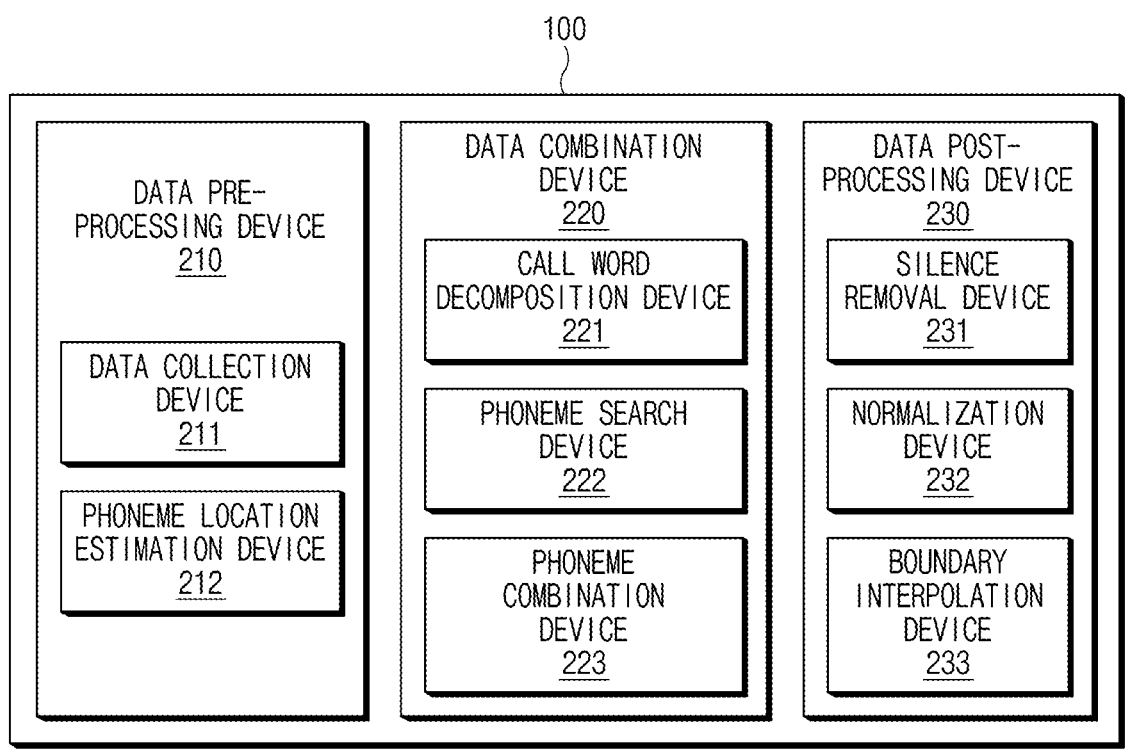
FIG. 2 is a block diagram illustrating an example of a software configuration of a call word learning data generation device.

FIG. 2 is a block diagram showing a software configuration of a call word learning data generation device. Operations performed by software components described later may be performed by the call word learning data generation device 100 of FIG. 1 or the processor 110 of the call word learning data generation device 100.

Referring to FIG. 2, the call word learning data generation device 100 may include a data pre-processing device 210, a data combination device 220, and a data post-processing device 230. The data pre-processing device 210 may include, for example, a data collection device 211 and a phoneme location estimation device 212.

The data collection device 211 may collect utterance data and an utterance phrase corresponding to the utterance data. The utterance data may be audio data. The utterance phrase may be text data. For example, the data collection device 211 may extract the utterance data and the utterance phrase from the storage 120 of the call word learning data generation device 100.

The phoneme location estimation device 212 may estimate location information indicating where a consonant and a vowel included in the utterance phrase are present in the utterance data. The phoneme location estimation device 212 may decompose the utterance data into phoneme units based on the estimated location information. For example, the phoneme location estimation device 212 may identify phonemes corresponding to the consonant and vowel of the utterance phrase from the utterance data and then may decompose the utterance data into phoneme units based on a location of the identified phoneme.

The data combination device 220 may include, for example, a call word decomposition device 221, a phoneme search device 222, and a phoneme combination device 223.

The call word decomposition device 221 may decompose a call word received through a user input into phoneme units. For example, when the user input is a text input, the processor 110 may convert a grapheme of the call word into phoneme and may decompose the converted call word into phoneme units. For example, when the user input is a voice input, the processor 110 may decompose a call word into phoneme units without a separate conversion process.

The phoneme search device 222 may search for phoneme data corresponding to phoneme data, which is obtained by decomposing the call word, in the decomposed phoneme data of the utterance data. For example, the phoneme search device 222 may search for phoneme data of utterance data that matches phoneme data of the call word. For example, pieces of phoneme data matching each other may correspond to pieces of phoneme data having the same phoneme as each other.

The phoneme combination device 223 may combine phoneme data of the utterance data, which matches the phoneme data of the call word. The phoneme combination device 223 may list and combine the phoneme data of the utterance data that is matched with the phoneme data of the call word in order of phonemes of the call word. For example, when there are pieces of phoneme data of the utterance data matching a piece of phoneme data of the call word, the phoneme combination device 223 may generate pieces of combined data respectively including pieces of phoneme data of the utterance data. For example, the phoneme combination device 223 may primarily generate call word learning data by combining the phoneme data of the utterance data that matches the phoneme data of the call word.

The data post-processing device 230 may include, for example, a silence removal device 231, a normalization device 232, and a boundary interpolation device 233. For example, the data post-processing device 230 may finally generate call word learning data by performing post-processing on the primarily generated call word learning data.

The silence removal device 231 may identify a silent section in the primarily generated call word learning data and may remove the identified silent section. For example, the silence removal device 231 may identify a section, in which a level of sound is not greater than a specified level (e.g., specified decibel (dB)), as the silent section. For example, the processor 231 may remove the silent section by converting the sound level of the silent section to '0' and cutting the section having '0' in data.

The normalization device 232 may normalize phoneme data included in the primarily generated call word learning data. For example, the normalization device 232 may perform normalization on data from which the silent section is removed by the silence removal device 231. For example, the normalization device 232 may normalize the fundamental frequency $f_0$ and power for each of pieces of phoneme data included in the call word learning data.

The boundary interpolation device 233 may correct a boundary section between pieces of phoneme data included in the primarily generated call word learning data. For example, the boundary interpolation device 233 may perform boundary section correction on data, from which the silent section is removed by the silence removal device 231, and/or data normalized by the normalization device 232. For example, the boundary interpolation device 233 may perform interpolation of a boundary section by using an average value of a pitch for each window size before and after the boundary section.

Hereinafter, a data pre-processing method of the call word learning data generation device 100 will be described with reference to FIGS. 3 and 4.

Figure 3:
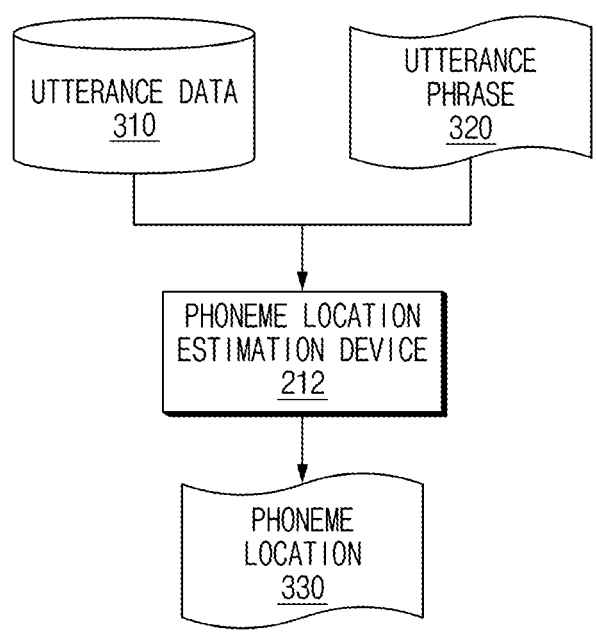
FIG. 3 is a diagram for describing an example of a data pre-processing method.

FIG. 3 is a diagram for describing a data pre-processing method. FIG. 4 is a diagram showing a data pre-processing result. Operations described below may be performed by the phoneme location estimation device 212 of FIG. 2.

Referring to FIG. 3, the phoneme location estimation device 212 may estimate a phoneme location 330 based on utterance data 310 and an utterance phrase 320. The utterance data 310 and the utterance phrase 320 may be stored in the storage 120 of the call word learning data generation device 100.

Figure 4:
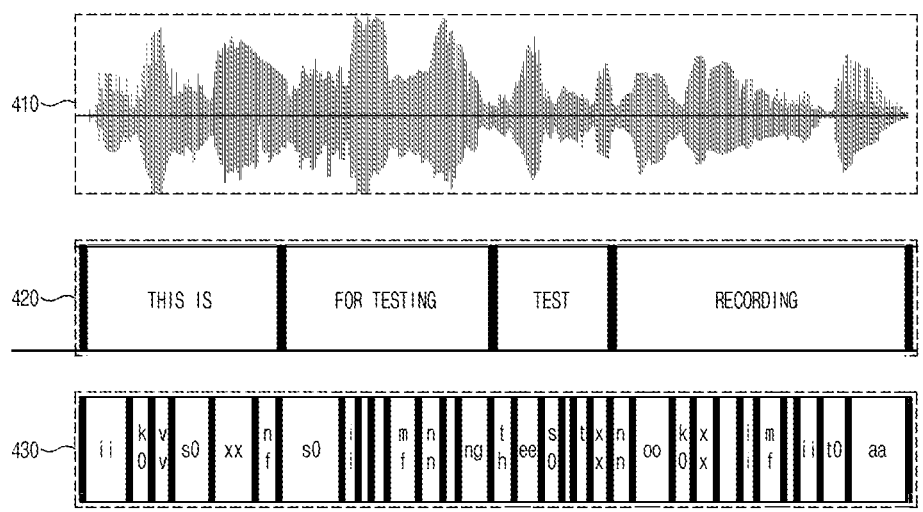
FIG. 4 is a diagram illustrating an example of a data pre-processing result.

For example, the utterance data 310 of FIG. 3 may correspond to an utterance data 410 of FIG. 4. The utterance data 410 may be noise-free voice data prepared in advance. For example, the utterance phrase 320 in FIG. 3 may correspond to an utterance phrase 420 in FIG. 4. The utterance phrase 420 may be text data corresponding to the utterance data 410. The utterance phrase 420 may be referred to a correct answer data for the utterance data 410.

The phoneme location estimation device 212 may estimate location information indicating where a consonant and a vowel included in the utterance phrase 320 are present in the utterance data 310. The estimated location information may include the phoneme location 330 of at least one phoneme constituting the utterance data 310.

The phoneme location estimation device 212 may decompose the utterance data 310 into phoneme units based on the phoneme location 330. Referring to FIG. 4, for example, the phoneme location estimation device 212 may identify a phoneme corresponding to the consonant and vowel of the utterance phrase 420 from the utterance data 410 and then may decompose the utterance data 410 into phoneme units based on location information 430 of the identified phoneme.

Figure 5:
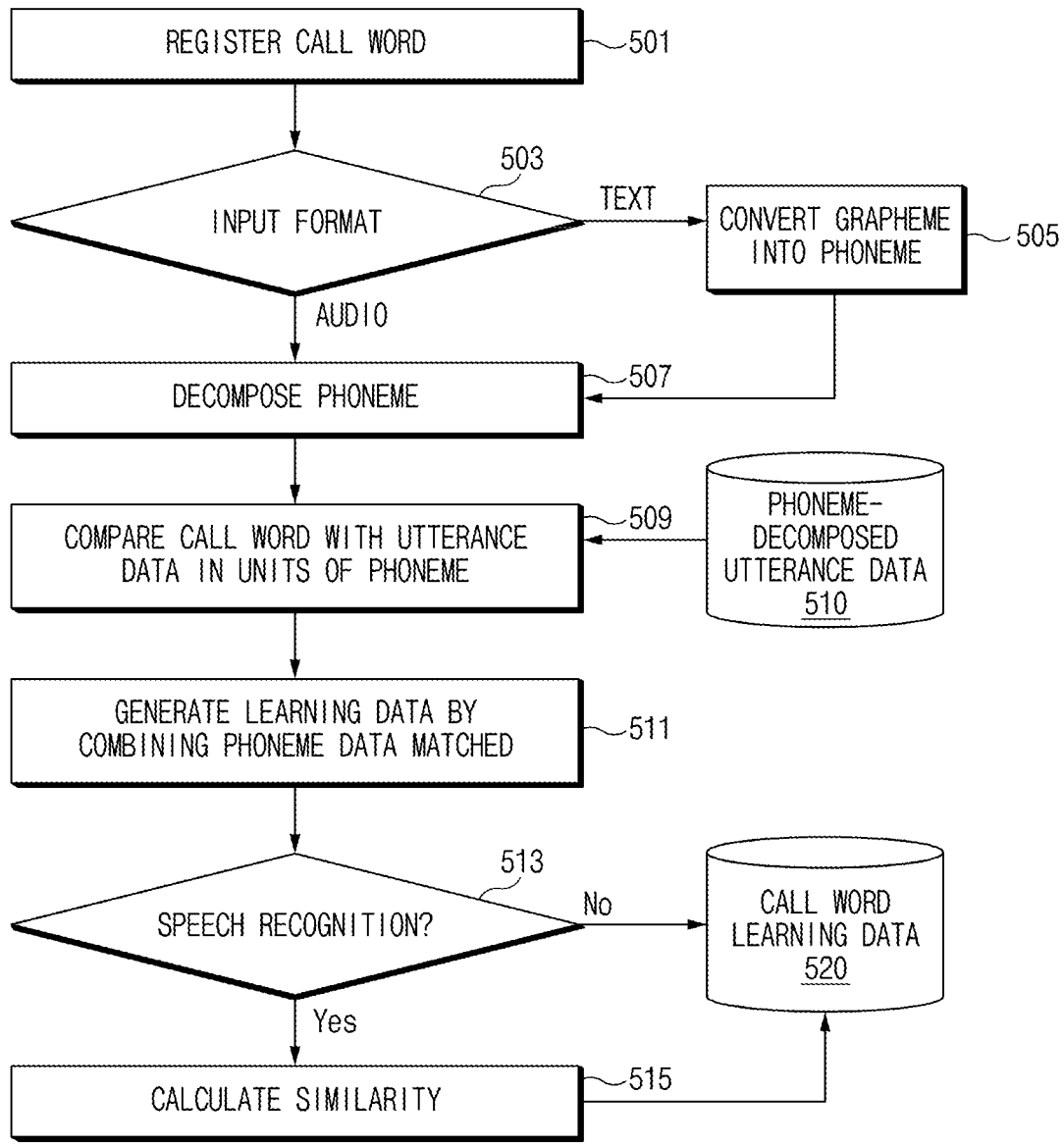
FIG. 5 is a flowchart for describing an example of a method of generating call word learning data.

FIG. 5 is a diagram for describing a method of generating call word learning data. Operations described later may be performed by the call word learning data generation device 100 of FIG. 1 or the processor 110 of the call word learning data generation device 100. For example, the operations described later may be performed by the data combination device 220 of FIG. 2.

In operation 501, the call word learning data generation device 100 may register a call word. For example, the call word learning data generation device 100 may receive a call word through a user input and then may register the received call word.

In operation 503, the call word learning data generation device 100 may identify an input format. For example, the call word learning data generation device 100 may identify the input format of a user input. For example, when the input format of the user input is a text, the call word learning data generation device 100 may perform operation 507 after performing operation 505. For example, when the input format of the user input is an audio (e.g., a voice), the call word learning data generation device 100 may perform operation 507.

In operation 505, the call word learning data generation device 100 may convert a grapheme of a text, which is input as a call word, into a phoneme. For example, the call word learning data generation device 100 may convert the grapheme of the text into the phoneme by using a G2P model. For example, the G2P model may be a statistical model or a DNN-based model.

In operation 507, the call word learning data generation device 100 may decompose the call word into phoneme units.

In operation 509, the call word learning data generation device 100 may compare the call word with utterance data in units of phoneme. For example, the call word learning data generation device 100 may determine whether the call word matches the utterance data, by comparing the call word, in which a phoneme is decomposed through operation 507, with phoneme-decomposed utterance data 510. For example, the phoneme-decomposed utterance data 510 may be data obtained by decomposing utterance data into phoneme units through data preprocessing of the call word learning data generation device 100 and may be stored in the storage 120. For example, when it is determined that phoneme data of the call word and phoneme data of the utterance data are the same phoneme as each other, the call word learning data generation device 100 may determine that the two pieces of phoneme data match each other.

In operation 511, the call word learning data generation device 100 may generate learning data by combining the phoneme data of utterance data matched as the comparison result in operation 509. For example, the call word learning data generation device 100 may list and combine the phoneme data of the utterance data that is matched with the phoneme data of the call word in order of phonemes of the call word. For example, when there are pieces of phoneme data of utterance data matching a piece of phoneme data of a call word, the call word learning data generation device 100 may generate pieces of combined data in which the pieces of phoneme data of the utterance data are included in the corresponding phoneme order.

In operation 513, the call word learning data generation device 100 may identify speech recognition for the call word. For example, when the speech recognition for the call word is performed, the call word learning data generation device 100 may perform operation 515. For example, when the speech recognition for the call word is not performed, the call word learning data generation device 100 may use the learning data generated in operation 511 as the primarily generated call word learning data 520.

In operation 515, the call word learning data generation device 100 may calculate the similarity between the speech-recognized call word and the learning data generated in operation 511. For example, call word learning data in which the similarity between the speech-recognized call word and the learning data generated in operation 511 is less than a specified value may be excluded. For example, when the speech recognition for the call word is performed, the call word learning data generation device 100 may use learning data, of which the similarity calculated in operation 515 is equal to or greater than the specified value, as primarily generated call word learning data 520.

The call word learning data generation device 100 may perform post-processing on the primarily generated call word learning data 520. The post-processing method will be described later in detail with reference to FIG. 6.

Figure 6:
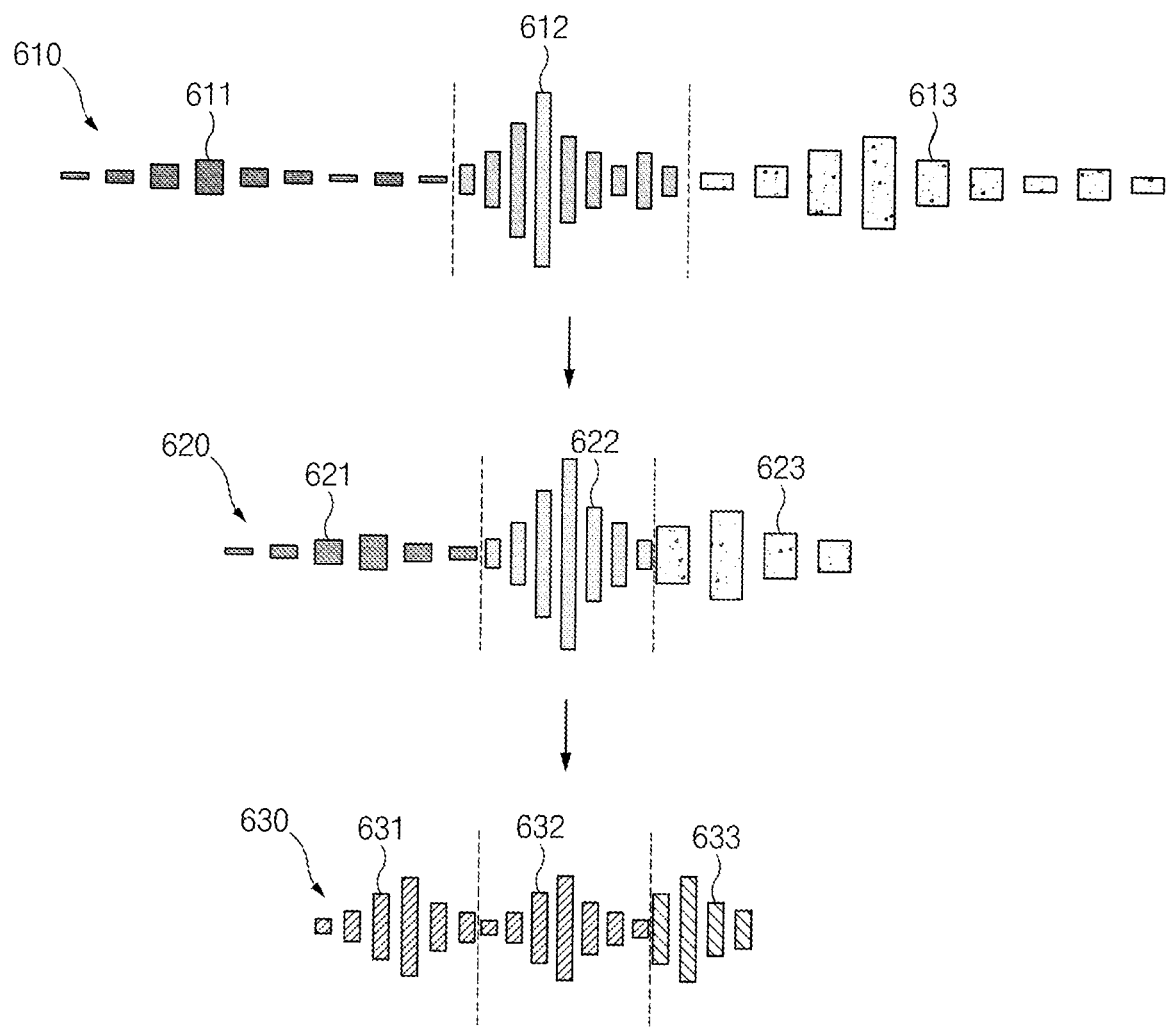
FIG. 6 is a diagram for describing an example of a data post-processing method.

FIG. 6 is a diagram for describing a data post-processing method. Operations described later may be performed by the call word learning data generation device 100 of FIG. 1 or the processor 110 of the call word learning data generation device 100. For example, the operations described later may be performed by the data post-processing device 230 of FIG. 2.

Referring to FIG. 6, the call word learning data generation device 100 may perform post-processing on first data 610, which is one of primarily generated learning data (e.g., the call word learning data 520 in FIG. 5). For example, the first data 610 may be data obtained by combining first phoneme data 611, second phoneme data 612, and third phoneme data 613.

The call word learning data generation device 100 may identify a silent section in the first data 610. For example, the call word learning data generation device 100 may identify a silent section in each of the first phoneme data 611, the second phoneme data 612, and the third phoneme data 613. For example, the call word learning data generation device 100 may identify a section, in which the level of sound is not greater than a specified level (e.g., specified decibel (dB)), as the silent section.

The call word learning data generation device 100 may generate second data 620 by removing the silent section identified in the first data 610. For example, the second data 620 may include fourth phoneme data 621, fifth phoneme data 622, and sixth phoneme data 623. For example, the fourth phoneme data 621 may be phoneme data obtained by deleting a silent section from the first phoneme data 611. For example, the fifth phoneme data 622 may be phoneme data obtained by deleting a silent section from the second phoneme data 612. For example, the sixth phoneme data 623 may be phoneme data obtained by deleting a silent section from the third phoneme data 613.

The call word learning data generation device 100 may generate third data 630 by normalizing phoneme data included in the second data 620 and correcting a boundary section between pieces of phoneme data. For example, the fundamental frequency and power of each of the fourth phoneme data 621, the fifth phoneme data 622, and the sixth phoneme data 623 may be different. The call word learning data generation device 100 may normalize the fundamental frequency and power of each of the fourth phoneme data 621, the fifth phoneme data 622, and the sixth phoneme data 623.

For example, the third data 630 may include seventh phoneme data 631, eighth phoneme data 632, and ninth phoneme data 633. For example, the seventh phoneme data 631 may be phoneme data obtained by normalizing the fourth phoneme data 621. For example, the eighth phoneme data 632 may be phoneme data obtained by normalizing the fifth phoneme data 622. For example, the ninth phoneme data 633 may be phoneme data obtained by normalizing the sixth phoneme data 623. The pitch and volume of each sound of the seventh phoneme data 631, the eighth phoneme data 632, and the ninth phoneme data 633 may be included within a specified range. Accordingly, the seventh phoneme data 631, the eighth phoneme data 632, and the ninth phoneme data 633 may be harmonized in the third data 630.

The call word learning data generation device 100 may generate the third data 630 by correcting a boundary section between pieces of phoneme data included in the second data 620. For example, the call word learning data generation device 100 may perform interpolation of a boundary section by using an average value of a pitch for each window size before and after the boundary section. For example, the call word learning data generation device 100 may perform interpolation of the boundary section of the fourth phoneme data 621 and the fifth phoneme data 622 by using the average value of a pitch for each window size before and after the boundary section between the fourth phoneme data 621 and the fifth phoneme data 622. For example, the call word learning data generation device 100 may perform interpolation of the boundary section of the fifth phoneme data 622 and the sixth phoneme data 623 by using the average value of a pitch for each window size before and after the boundary section between the fifth phoneme data 622 and the sixth phoneme data 623. Accordingly, in the third data 630, the boundary section between the seventh phoneme data 631 and the eighth phoneme data 632 may be naturally connected to the boundary section between the eighth phoneme data 632 and the ninth phoneme data 633.

The call word learning data generation device 100 performs post-processing on call word learning data generated primarily by simply combining pieces of phoneme data, thereby generating high-quality learning data capable of being identified as voice data for uttering a call word.

The call word learning data generation device 100 may learn a call word recognition model by using call word learning data (e.g., the third data 630), which is post-processed and finally generated, and thus may allow the call word recognition model to quickly and accurately recognize a changed call word without recording the call word for the changed call word.

Figure 7:
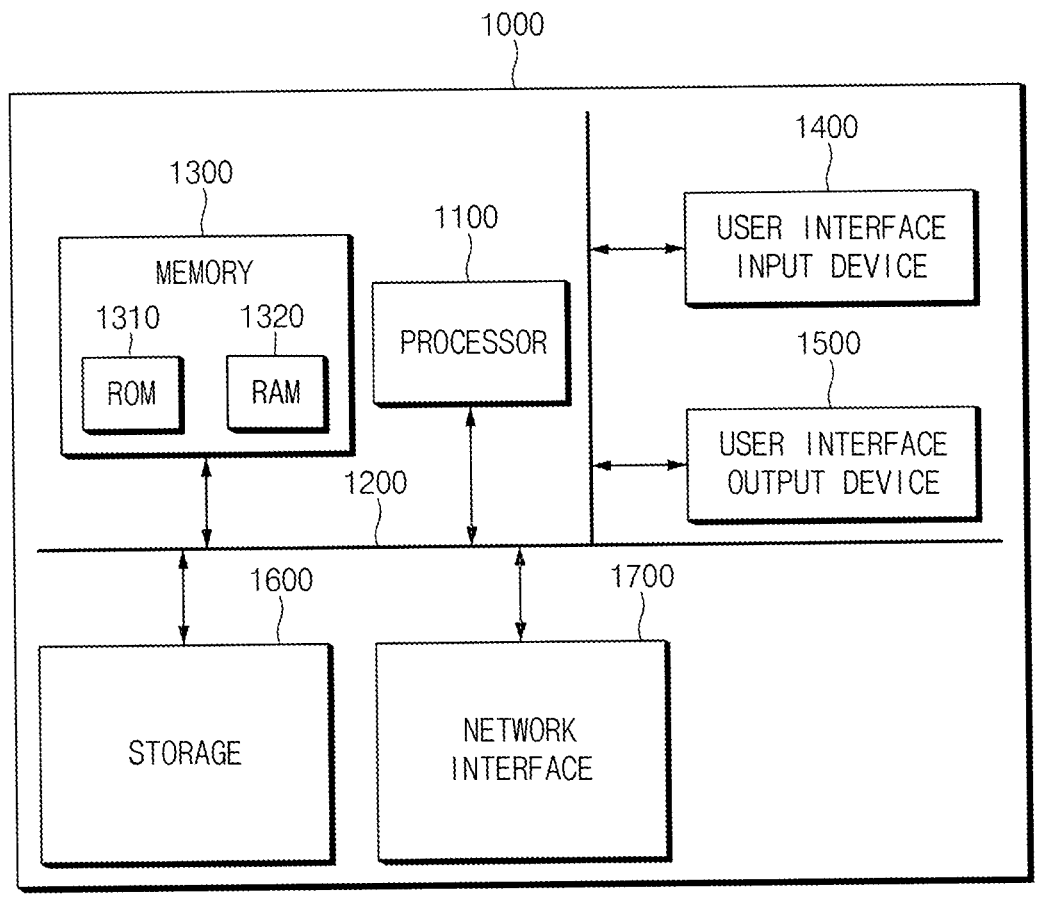
FIG. 7 illustrates an example of a computing system.

FIG. 7 illustrates a computing system.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Thus, the operations of the methods or algorithms described in connection with the implementations disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The present technology may provide a call word learning data generation device used to learn a call word recognition model by building learning data for the changed call word without recording the changed call word even when the call word is changed, and a method thereof.

Moreover, the present technology may provide a call word recognition model capable of changing a call word while high speed and high performance are maintained, by building learning data for the changed call word without recording the changed call word.

What is claimed is:

1. A call word learning data generation device, the device comprising:
   a processor; and
   a storage configured to store utterance data and an utterance phrase corresponding to the utterance data,
   wherein the processor is configured to:
   decompose the utterance data into phoneme units based on the utterance data and the utterance phrase to generate utterance phoneme data from the decomposed utterance data,
   receive a call word through a user input,
   decompose the received call word into phoneme units to generate call word phoneme data from the decomposed call word,
   compare the utterance phoneme data with the call word phoneme data, and
   generate call word learning data by combining phoneme data that matched according to the comparison result.

2. The device of claim 1, wherein the utterance data is audio data, and the utterance phrase is text data,
   wherein the processor is configured to:
   estimate location information indicating where a consonant and a vowel included in the utterance phrase are present in the utterance data, and
   decompose the utterance data into phoneme units based on the location information.

3. The device of claim 1, wherein the user input is a text input or a voice input, and
   wherein the processor is configured to:
   based on the user input being a text input, convert a grapheme of the call word into a phoneme, and decompose the converted call word into phoneme units.

4. The device of claim 1, wherein the processor is configured to:
   list and combine the utterance phoneme data, which matches the call word phoneme data, in order of phonemes of the call word.

5. The device of claim 1, wherein the processor is configured to:
   determine whether speech recognition is performed on the call word,
   based on a determination that the speech recognition is performed on the call word, calculate a similarity between the speech-recognized call word and the call word learning data, and
   exclude call word learning data with the similarity less than a specified value.

6. The device of claim 1, wherein the processor is configured to:
   identify a silent section within the call word learning data, and
   remove the identified silent section.

7. The device of claim 1, wherein the processor is configured to:
   normalize phoneme data included in the call word learning data.

8. The device of claim 7, wherein the processor is configured to:
   normalize a fundamental frequency and power of the phoneme data.

9. The device of claim 1, wherein the processor is configured to:
   correct a boundary section between pieces of phoneme data included in the call word learning data.

10. The device of claim 9, wherein the processor is configured to:
    perform interpolation of the boundary section by using an average pitch value for each window size before and after the boundary section.

11. A call word learning data generating method performed by a call word learning data generation device, the method comprising:
    decomposing utterance data into phoneme units based on the utterance data and an utterance phrase stored in the call word learning data generation device to generate utterance phoneme data from the decomposed utterance data;
    receiving a call word through a user input;
    decomposing the received call word into phoneme units to generate call word phoneme data from the decomposed call word;
    comparing the utterance phoneme data with the call word phoneme data; and
    generating call word learning data by combining phoneme data that matched according to the comparison result.

12. The method of claim 11, wherein the utterance data is audio data, and the utterance phrase is text data,
    wherein decomposing the utterance data into the phoneme units includes:
    estimating location information indicating where a consonant and a vowel included in the utterance phrase are present in the utterance data, and
    decomposing the utterance data into phoneme units based on the location information.

13. The method of claim 11, wherein the user input is a text input or a voice input, and
wherein decomposing the utterance data into phoneme units includes:
based on the user input being a text input:
converting a grapheme of the call word into a phoneme, and
decomposing the converted call word into phoneme units.

14. The method of claim 11, wherein generating the call word learning data includes:
listing and combining the utterance phoneme data, which matches the call word phoneme data, in order of phonemes of the call word.

15. The method of claim 11, further comprising:
determining whether speech recognition is performed on the call word;
based on a determination that the speech recognition is performed on the call word, calculating a similarity between the speech-recognized call word and the call word learning data; and
excluding call word learning data with the similarity less than a specified value.

16. The method of claim 11, further comprising:
identifying a silent section within the call word learning data; and
removing the identified silent section.

17. The method of claim 11, further comprising:
normalizing phoneme data included in the call word learning data.

18. The method of claim 17, wherein normalizing the phoneme data includes:
normalizing a fundamental frequency and power of the phoneme data.

19. The method of claim 11, further comprising:
correcting a boundary section between pieces of phoneme data included in the call word learning data.

20. The method of claim 19, wherein correcting the boundary section includes:
performing interpolation of the boundary section by using an average pitch value for each window size before and after the boundary section.

* * * * *